United States Patent
Xu et al.

(10) Patent No.: US 10,530,693 B2
(45) Date of Patent: Jan. 7, 2020

(54) CONGESTION CONTROL METHOD AND APPARATUS, AND RELATED DEVICE

(71) Applicant: Huawei Technologies Co., Ltd., Shenzhen (CN)

(72) Inventors: Qing Xu, Shanghai (CN); Wei Zhou, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/120,000

(22) Filed: Aug. 31, 2018

(65) Prior Publication Data
US 2018/0375775 A1    Dec. 27, 2018

Related U.S. Application Data

(63) Continuation of application No. PCT/CN2016/077356, filed on Mar. 25, 2016.

(51) Int. Cl.
*H04L 12/801* (2013.01)

(52) U.S. Cl.
CPC .................................. *H04L 47/12* (2013.01)

(58) Field of Classification Search
CPC ..... H04L 47/12; H04L 47/127; H04L 47/193; H04W 28/0273
See application file for complete search history.

(56) References Cited

U.S. PATENT DOCUMENTS

2014/0254385 A1*  9/2014  Tabatabaee ............. H04L 47/11
                                                              370/236
2014/0369197 A1* 12/2014  Stenfelt .............. H04W 28/0289
                                                              370/235

FOREIGN PATENT DOCUMENTS

| CN | 105049369 A | 11/2015 |
| WO | 2009058084 A1 | 5/2009 |
| WO | 2015069944 A1 | 5/2015 |
| WO | 2015161990 A1 | 10/2015 |

OTHER PUBLICATIONS

Allman, M. et al., "TCP Congestion Control," Network Working Group, RFC5681, Sep. 2009, 18 pages.

* cited by examiner

*Primary Examiner* — Hashim S Bhatti
(74) *Attorney, Agent, or Firm* — Slater Matsil, LLP

(57) ABSTRACT

The present disclosure provides a congestion control method and apparatus, and a related device. The method in the present disclosure may include: obtaining a transmission rate of a transmission link, and obtaining a congestion control window size of the transmission link; calculating a congestion risk coefficient of the transmission link based on the transmission rate and the congestion control window size; and determining whether the congestion risk coefficient is not less than a preset threshold, and if the congestion risk coefficient is not less than the preset threshold, triggering an adjustment to the congestion control window size.

19 Claims, 9 Drawing Sheets

CONGESTION CONTROL METHOD AND APPARATUS, AND RELATED DEVICE

CROSS-REFERENCE TO RELATED APPLICATIONS

This application is a continuation of International Application No. PCT/CN2016/077356, filed on Mar. 25, 2016, the disclosure of which is hereby incorporated by reference in its entirety.

TECHNICAL FIELD

The present disclosure relates to the field of communications technologies, and in particular, to a congestion control method and apparatus, and a related device.

BACKGROUND

A control plane message of a Long Term Evolution (LTE) system is used to ensure normal operation of the system, normal establishment and disengagement of a service connection, and the like. Therefore, reliability of the control plane message is extremely important in the LTE system. For example, in an architecture of an LTE evolved packet core (EPC), after a mobility management entity (MME) receives a downlink data communication message sent by a serving gateway (SGW), the MME needs to send a paging message to all evolved NodeBs (eNB) in a tracking area list (TA List) in which a user is located, so that the eNB forwards the paging message to a user equipment (UE). After receiving the paging message, the UE can initiate a radio resource control (RRC) connection, to receive data. A paging packet is sent using S1 signaling between the MME and the eNB, and the S1 signaling and X2 signaling that is between the eNBs are transmitted based on the Stream Control Transmission Protocol (SCTP).

In a scenario of high load, because a quantity of SCTP signaling is relatively large or signaling traffic is relatively large, network congestion occurs in the system. Retransmission of excessive lost packets may cause an avalanche effect. In a severe case, link breaking is caused, and consequently other services can hardly be processed. Congestion control and congestion avoidance need to be properly performed, to avoid an MME/eNB exception caused by SCTP congestion.

SUMMARY

In view of the foregoing descriptions, embodiments of the present disclosure provide a congestion control method and apparatus, and a related device, to resolve a congestion problem and reduce a congestion risk.

A first aspect of the present disclosure provides a congestion control method. The method may include obtaining a transmission rate of a transmission link, and obtaining a congestion control window size of the transmission link. The method may also include calculating a congestion risk coefficient of the transmission link based on the transmission rate and the congestion control window size. The method may also include determining whether the congestion risk coefficient is not less than a preset threshold, and if the congestion risk coefficient is not less than the preset threshold, triggering an adjustment to the congestion control window size.

It can be learned that, in the present disclosure, a relatively safe preset threshold used to detect a congestion risk is preset, then the transmission rate and the congestion control window size that are of the transmission link are obtained in real time, and a current congestion risk coefficient is calculated based on the transmission rate and the congestion control window size. If the congestion risk coefficient is not less than the preset threshold, it indicates that a congestion may burst on the transmission link, and then an adjustment to the congestion control window size is triggered, so as to identify congestion in advance and avoid congestion, thereby reducing impact on the transmission link caused by congestion packet loss, and improving network bandwidth utilization.

The adjustment to the congestion control window size mainly means lowering the congestion control window size, and reducing an upper limit of streams that can be transmitted on the transmission link, so as to control congestion.

Optionally, in some embodiments of the present disclosure, the obtaining a transmission rate of a transmission link, and obtaining a congestion control window size of the transmission link described above may specifically include: obtaining a sending rate of a transmit end on the transmission link and/or a receiving rate of a receive end on the transmission link, and obtaining a congestion control window size of the transmit end on the transmission link and/or a congestion control window size of the receive end on the transmission link. It can be learned that two ends of the transmission link are respectively the transmit end and the receive end, and the transmit end has the sending rate and the congestion control window size of the transmit end. Likewise, the receive end has the receiving rate and the congestion control window size of the receive end. Further, in this embodiment, the congestion risk coefficient of the transmission link may be calculated based on the sending rate of the transmit end and/or the receiving rate of the receive end and the congestion control window size of the transmit end and/or the congestion control window size of the receive end. This can comprehensively consider actual statuses of the transmit end and the receive end.

Optionally, in some embodiments of the present disclosure, after it is determined that the congestion risk coefficient is not less than the preset threshold, an adjustment to the congestion control window size of the transmit end may be triggered alone, or an adjustment to the congestion control window size of the receive end may be triggered alone, or both an adjustment to the congestion control window size of the transmit end and an adjustment to the congestion control window size of the receive end may be triggered.

Optionally, in some embodiments of the present disclosure, the transmission rate and the congestion control window size that are of the transmission link may be obtained based on a cycle, so as to cyclically start the congestion control method provided in the present disclosure, thereby identifying congestion of the transmission link. It may be understood that the cycle is not merely a cycle for obtaining the transmission rate, but is actually a cycle for implementing the congestion control method provided in the present disclosure.

A second aspect of the present disclosure provides a congestion control apparatus, and the apparatus may include: an obtaining module, a calculation module, and an adjustment module. The obtaining module may be configured to obtain a transmission rate of a transmission link, and obtain a congestion control window size of the transmission link. The calculation module may be configured to calculate a congestion risk coefficient of the transmission link based on the transmission rate and the congestion control window size. The an adjustment module may be configured to determine whether the congestion risk coefficient is not less than a preset threshold, and if the congestion risk coefficient is not less than the preset threshold, trigger an adjustment to the congestion control window size.

Optionally, in some embodiments of the present disclosure, the obtaining module is specifically configured to: obtain a sending rate of a transmit end on the transmission link and/or a receiving rate of a receive end on the transmission link, and obtain a congestion control window size of the transmit end on the transmission link and/or a congestion control window size of the receive end on the transmission link.

Optionally, in some embodiments of the present disclosure, the calculation module is specifically configured to calculate the congestion risk coefficient of the transmission link based on the sending rate of the transmit end and/or the receiving rate of the receive end and the congestion control window size of the transmit end and/or the congestion control window size of the receive end.

Optionally, in some embodiments of the present disclosure, the adjustment module is specifically configured to trigger an adjustment to the congestion control window size of the transmit end and/or the congestion control window size of the receive end.

Optionally, in some embodiments of the present disclosure, the obtaining module is further specifically configured to: based on a preset cycle, measure the transmission rate of the transmission link and obtain the congestion control window size of the transmission link.

A third aspect of the present disclosure provides a congestion control apparatus, and the apparatus may include: a processor and a memory, where the memory is configured to store a program including instructions. The processor is configured to invoke the program instructions to perform the steps provided in the first aspect.

A fourth aspect of the present disclosure provides a core network device, including the congestion control apparatus provided in the second aspect or the congestion control apparatus provided in the third aspect.

A fifth aspect of the present disclosure provides an access network device, including the congestion control apparatus provided in the second aspect or the congestion control apparatus provided in the third aspect.

A sixth aspect of the present disclosure provides a congestion control system, including the core network device provided in the fourth aspect and the access network device provided in the fifth aspect.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DETAILED DESCRIPTION OF ILLUSTRATIVE EMBODIMENTS

To make the disclosure objectives, features, and advantages of the present disclosure clearer and more comprehensible, the following describes the technical solutions in the embodiments of the present disclosure with reference to the accompanying drawings in the embodiments of the present disclosure. Apparently, the embodiments described are merely some rather than all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between different objects but do not indicate a particular order. In addition, the terms "include", "contain", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Embodiments of the present disclosure provide a congestion control method, to identify congestion in advance and avoid congestion, thereby reducing impact on a transmission link caused by congestion packet loss, and improving link bandwidth utilization. The embodiments of the present disclosure further provide an apparatus corresponding to the congestion control method, a core network device, and an access network device.

Although an LTE system is used as an example for description in the foregoing background part, a person skilled in the art should know that the present disclosure is not only applicable to the LTE system, but also applicable to other wireless communications systems, such as a Global System for Mobile Communications (GSM), a Universal Mobile Telecommunications System (UMTS), a Code Division Multiple Access (CDMA) system, or a new network system. Specific embodiments are described using the LTE system as an example below.

Figure 1A:
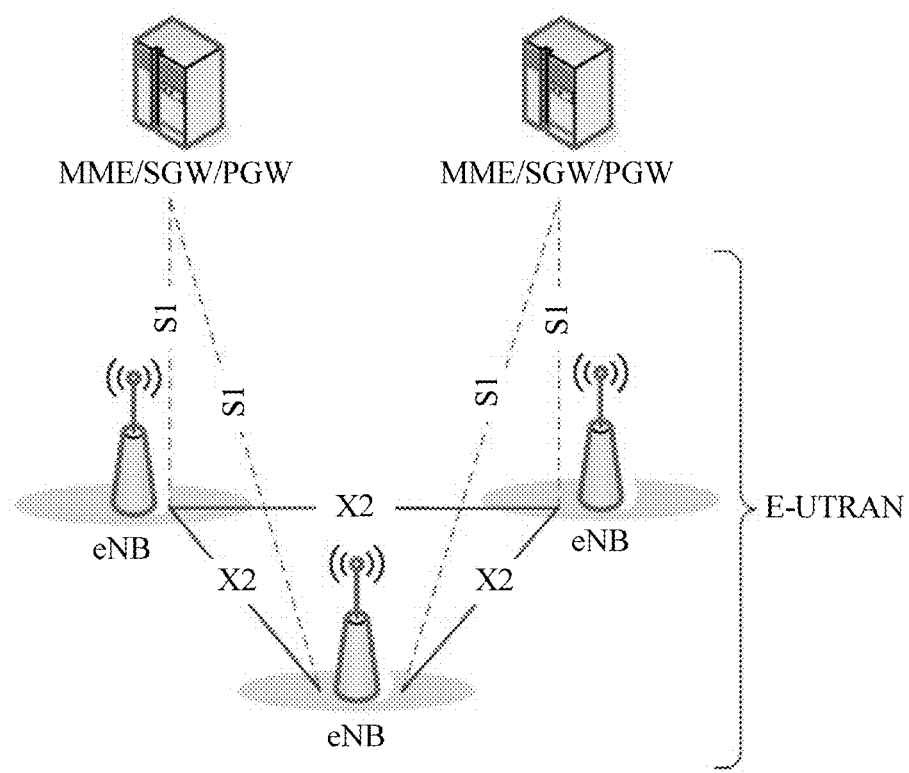
FIG. 1a is a schematic diagram of an application scenario according to an embodiment of the present disclosure.

FIG. 1a is a schematic diagram of an application scenario according to an embodiment of the present disclosure. As shown in FIG. 1a, an evolved universal terrestrial radio access network (E-UTRAN) includes a plurality of eNBs, MMEs/SGWs/packet data network gateways (PGW). The eNB implements a radio physical layer function, resource scheduling and radio resource management, radio access control, and a mobility management function. The MME is mainly responsible for all control plane functions of session management of a user, including TA list management and selection of the PGW and the SGW. The SGW is mainly responsible for data transmission, data forwarding, route switching, and the like of a UE, and serves as a local mobility anchor when the UE is handed over between the eNBs. The PGW is an anchor of a packet data network (PDN) connection, and is responsible for assigning an Internet Protocol (IP) address to the UE, filtering a data packet of the UE, controlling a rate, and generating charging information.

The eNBs may be connected to each other using an X2 interface, the eNBs are connected to the MME/SGW/PGW using an S1 interface, and both X2 signaling and S1 signaling are transmitted based on the SCTP protocol.

It may be understood that another network system, such as a GSM or a CDMA system, includes a base transceiver station (BTS) or includes a NodeB in WCDMA, instead of the eNB. The eNB may support or manage one or more cells. When UE needs to communicate with a network, the UE selects a cell to initiate network access.

For example, the UE may be a mobile terminal, for example, a mobile phone (or referred to as a "cellular" phone), and a computer that has a mobile terminal. For example, the UE may be a portable, pocket-sized, handheld, computer built-in, or in-vehicle mobile apparatus that exchanges voice and/or data with a radio access network. For example, the UE may be a device such as a personal communication service (PCS) phone, a cordless telephone set, a Session Initiation Protocol (SIP) phone, a wireless local loop (WLL) station, or a personal digital assistant (PDA). The UE may also be referred to as a system, a subscriber unit, a subscriber station, a mobile station, a mobile console, a remote station, an access point, a remote terminal, an access terminal, a user terminal, a user agent, or the like.

Figure 1B:
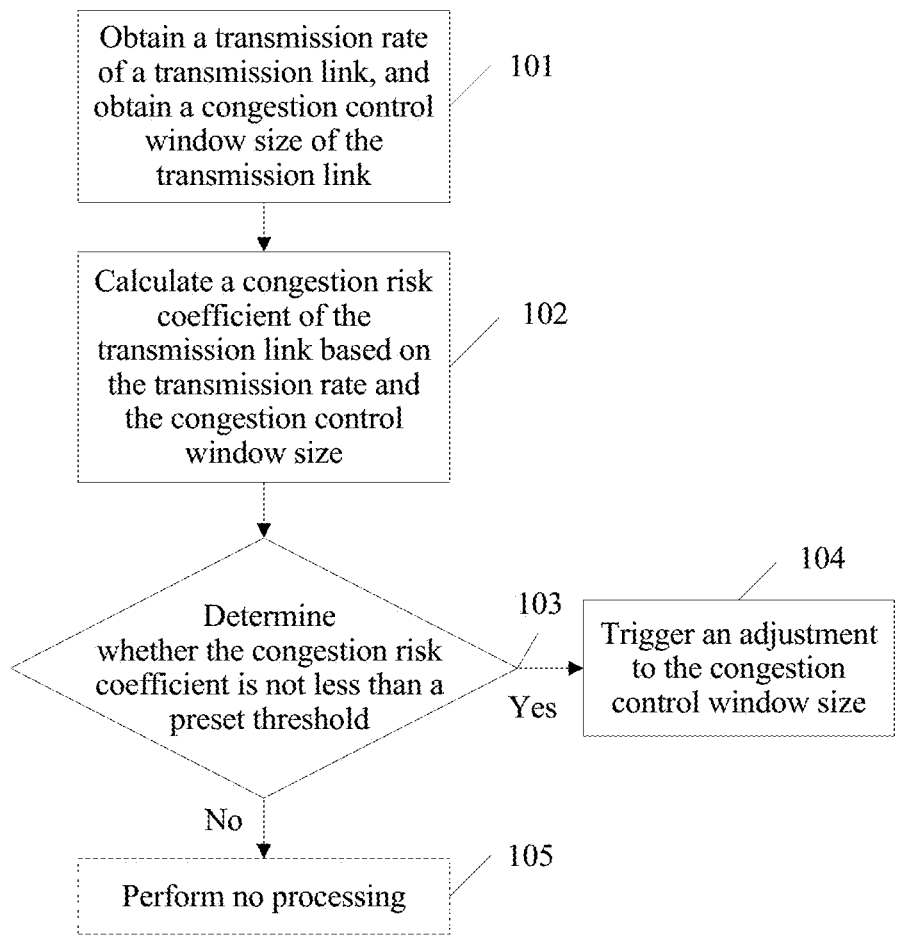
FIG. 1b is a schematic flowchart of a congestion control method according to some embodiments of the present disclosure.

Based on the foregoing descriptions, some embodiments of the present disclosure provide a congestion control method. As shown in FIG. 1b, the congestion control method specifically includes the following steps.

101. Obtain a transmission rate of a transmission link, and obtain a congestion control window size of the transmission link.

It may be understood that two ends of the transmission link are respectively a transmit end and a receive end. The transmit end may be any one of the eNB, the BTS, the NodeB, and the like described above. In this case, the receive end is any one of the MME, the SGW, and the PGW described above. Alternatively, the transmit end may be any one of the MME, the SGW, and the PGW described above, and the receive end may be any one of the eNB, the BTS, the NodeB, and the like described above. Certainly, in some other embodiments of the present disclosure, the transmit end may alternatively be any one of the eNB, the BTS, the NodeB, and the like described above, and the receive end is the UE described above. Alternatively, the transmit end is the UE, and the receive end is any one of the eNB, the BTS, the NodeB, and the like. Certainly, this embodiment of the present disclosure may be further applied to another link connection-based communications system.

It should be noted that this embodiment of the present disclosure is performed by a congestion control apparatus. The congestion control apparatus may be disposed in a transmit end or a receive end, or the congestion control apparatus may be disposed in both a transmit end and a receive end.

When the congestion control apparatus is disposed in only one of the transmit end and the receive end, the transmit end or the receive end in which the congestion control apparatus is disposed performs the congestion control method provided in the present disclosure. When the congestion control apparatus is disposed in both the transmit end and the receive end, one of the transmit end and the receive end performs, using the disposed congestion control apparatus, the congestion control method provided in the present disclosure, and the other of the transmit end and the receive end may participate in adjusting the congestion control window size using the disposed congestion control apparatus.

The congestion control window size indicates a maximum quantity of streams that can be transmitted on the transmission link.

It should be further noted that, in this embodiment of the present disclosure, there is no sequence of obtaining the transmission rate of the transmission link and obtaining the congestion control window size of the transmission link. The transmission rate of the transmission link may be obtained before the congestion control window size of the transmission link is obtained, or the congestion control window size of the transmission link may be obtained before the transmission rate of the transmission link is obtained, or the transmission rate and the congestion control window size of the transmission link may be simultaneously obtained.

102. Calculate a congestion risk coefficient of the transmission link based on the transmission rate and the congestion control window size.

A preset threshold is preset in the congestion control apparatus, and the preset threshold is used to indicate an upper congestion risk coefficient limit that causes no transmission link congestion to the transmission link.

The congestion risk coefficient is used to indicate a congestion risk status of the transmission link.

103. Determine whether the congestion risk coefficient is not less than a preset threshold.

If the congestion risk coefficient is not less than the preset threshold, proceed to step 104; or if the congestion risk coefficient is less than the preset threshold, proceed to step 105.

104. If the congestion risk coefficient is not less than the preset threshold, trigger an adjustment to the congestion control window size.

105. If the congestion risk coefficient is less than the preset threshold, perform no processing.

In this embodiment of the present disclosure, when the congestion risk coefficient is not less than the preset threshold, it indicates that congestion may burst on the transmission link at a current transmission rate and of a current congestion control window size, so that an adjustment to the congestion control window size is triggered. The adjustment includes three manners: only the transmit end participates in the adjustment; only the receive end participates in the adjustment; both the transmit end and the receive end participate in the adjustment.

In addition, when the congestion risk coefficient is less than the preset threshold, it is identified that no congestion risk bursts on the transmission link, and a congestion avoidance operation may not need to be performed in advance.

In the present disclosure, a relatively safe preset threshold used to detect a congestion risk is set, then the transmission rate and the congestion control window size that are of the transmission link are obtained in real time, and a current congestion risk coefficient is calculated based on the transmission rate and the congestion control window size. If the congestion risk coefficient is not less than the preset threshold, it indicates that a congestion may burst on the transmission link, and then an adjustment to the congestion control window size is triggered, so as to identify congestion in advance and avoid congestion, thereby reducing impact on the transmission link caused by congestion packet loss, and improving network bandwidth utilization.

It should be noted that, this embodiment of the present disclosure may be performed based on a specific cycle. To be specific, a cycle is set, for example, a cycle of 10 s is set, and this embodiment of the present disclosure is performed every 10 s, to identify a congestion risk on the transmission link in real time, thereby avoiding congestion.

It may be understood that the transmission link may be an SCTP link between an MME and an eNB. Certainly, the transmission link may also be applicable to another link layer, for example, a Transmission Control Protocol (TCP)-based link and an IP protocol-based link. The technical solutions of the present disclosure are described in detail below using the SCTP link between the MME and the eNB as an example. In a subsequent embodiment, the MME serves as a transmit end, and the eNB serves as a receive end. Alternatively, the eNB serves as a transmit end, and the MME serves as a receive end, and this is similar to a case in which the MME serves as a transmit end and the eNB serves as a receive end. Details are not described in this embodiment of the present disclosure.

Figure 2:
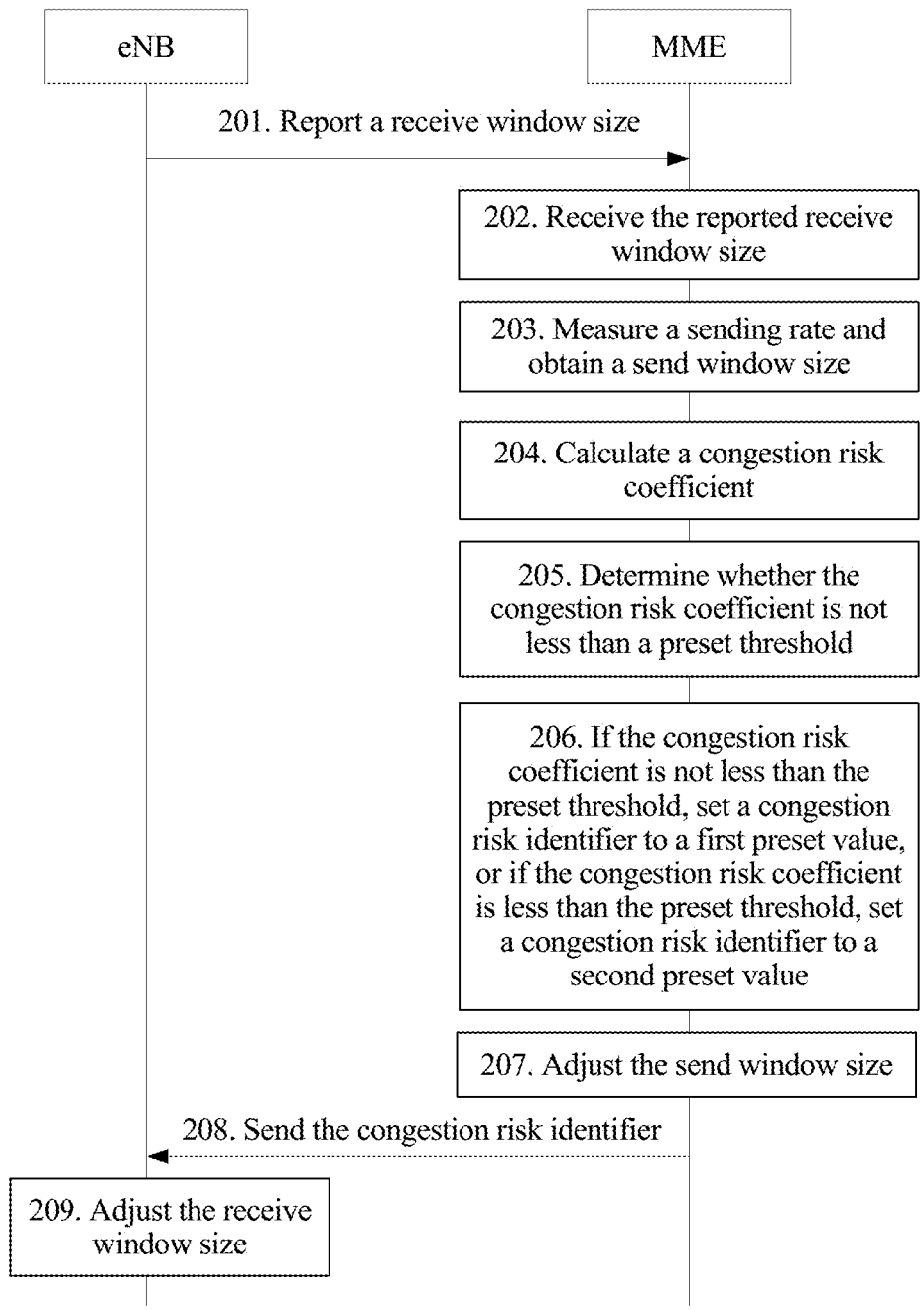
FIG. 2 is a schematic flowchart of a congestion control method according to some embodiments of the present disclosure.

FIG. 2 is a schematic flowchart of a congestion control method according to some embodiments of the present disclosure. As shown in FIG. 2, the congestion control method may include the following steps.

201. An eNB reports a receive window size to an MME.

It should be noted that the congestion control window size of the receive end described above is the receive window size described herein and a receive window size described below. The eNB reports, to the MME based on the SCTP protocol, a current receive window size that is of the eNB and that is used for receiving a data stream. The receive window size indicates a maximum quantity of data streams that can be received by the eNB.

202. The MME receives the receive window size reported by the eNB.

203. The MME measures a sending rate and obtains a send window size.

It should be noted that, in this embodiment of the present disclosure, the MME serves as a transmit end, and the eNB serves as a receive end. A congestion control apparatus provided in the embodiment of the present disclosure is disposed in the MME. Certainly, the congestion control apparatus provided in the embodiment of the present disclosure may also be disposed in the eNB. The congestion control apparatus disposed in the eNB is configured to adjust the receive window size, but does not determine a congestion risk coefficient. Specific descriptions are given below.

The send window size indicates a maximum quantity of data streams that can be sent by the MME. The congestion control window size of the transmit end described above is the send window size described herein and a send window size described below.

It should be further noted that, a cycle is preset in the eNB and the MME. The cycle is a cycle for performing the technical solutions of the present disclosure. When the preset cycle expires, the congestion control method provided in this embodiment of the present disclosure is performed. For example, in this embodiment of the present disclosure, the eNB detects that the preset cycle expires, and then the eNB reports the receive window size to the MME. The MME detects that the preset cycle expires, starts to measure the sending rate of the MME, and obtains the send window size of the MME. Certainly, the MME may measure the sending rate before obtaining the send window size of the MME; or the MME may obtain the send window size of the MME before measuring the sending rate; or the MME may measure the sending rate and obtain the send window size simultaneously.

It is further noted that, for a sequence of step 201 and step 202, step 201 is performed before step 202 is performed. However, a sequence for performing step 201, step 202, and step 203 may be as follows: 201→203→202; or 201→202→203; or 203→201→202; or (201, 203)→202. (201, 203) indicates that steps 201 and 203 are simultaneously performed.

204. The MME calculates a congestion risk coefficient of an SCTP link based on the receive window size, the sending rate, and the send window size.

The MME calculates a current congestion risk coefficient of the SCTP link based on the receive window size sent by the eNB and with reference to the send window size and the sending rate that are of the MME. It may be understood that the congestion risk coefficient is used to indicate a congestion risk status of the SCTP link.

205. The MME determines whether the congestion risk coefficient obtained through calculation is not less than a preset threshold.

A preset threshold is preset in the congestion control apparatus or the MME, and the preset threshold is used to indicate an upper congestion risk coefficient limit that causes no transmission link congestion to the SCTP link.

If the congestion risk coefficient is not less than the preset threshold, it indicates that the transmission link is at a high congestion risk, or if the congestion risk coefficient is less than the preset threshold, it is considered that currently, there is no congestion risk or a congestion risk is low.

206. If the congestion risk coefficient is not less than the preset threshold, the MME sets a congestion risk identifier to a first preset value, or if the congestion risk coefficient is less than the preset threshold, the MME sets a congestion risk identifier to a second preset value.

The MME sets a congestion risk identifier, to indicate the congestion risk status of the SCTP link using the congestion risk identifier. If the congestion risk identifier is set to the first preset value, in other words, the congestion risk coefficient is not less than the preset threshold, it indicates that the transmission link is at a high congestion risk. If the congestion risk identifier is set to the second preset value, in other words, the congestion risk coefficient is less than the preset threshold, it indicates that currently, there is no congestion risk or a congestion risk is low. The first preset value and the second preset value are any value. For example, when the congestion risk coefficient is not less than the preset threshold, the congestion risk identifier is set to 1. Otherwise, when the congestion risk coefficient is less than the preset threshold, the congestion risk identifier is set to 0.

207. The MME adjusts the send window size based on the congestion risk identifier.

It may be understood that, when the congestion risk identifier is set to the first preset value, the send window size is lowered. To be specific, a current send window size is reduced, so that an upper limit of data streams that are allowed to be transmitted by the MME is smaller, to be specific, a quantity of data streams that are allowed to be transmitted on the SCTP link during an instantaneous traffic burst is reduced. However, when the congestion risk identifier is set to the second preset value, a current send window size of the MME may be maintained without processing.

208. The MME sends the congestion risk identifier to the eNB.

209. The eNB receives the congestion risk identifier, and adjusts the receive window size based on the congestion risk identifier.

It should be noted that, in some embodiments of the present disclosure, it is possible that only the MME side needs to adjust the send window size, and the eNB does not need to participate in an adjustment. In other words, the eNB does not need to adjust the receive window size. Certainly, in some other embodiments of the present disclosure, when completing the adjustment to the send window size, the MME sends the congestion risk identifier to the eNB, so that the eNB side completes the adjustment to the receive window size.

It can be learned that, in this embodiment of the present disclosure, the MME calculates the congestion risk coefficient of the SCTP link based on the sending rate and the send window size that are of the MME and the receive window size of the eNB, and then determines, by comparing the congestion risk coefficient and the preset threshold, whether the send window size of the MME and the receive window size of the eNB need to be adjusted, so as to adjust the send window size and the receive window size before subsequent congestion caused by a data traffic burst, thereby reducing a congestion risk and improving service efficiency of the SCTP link.

Figure 3:
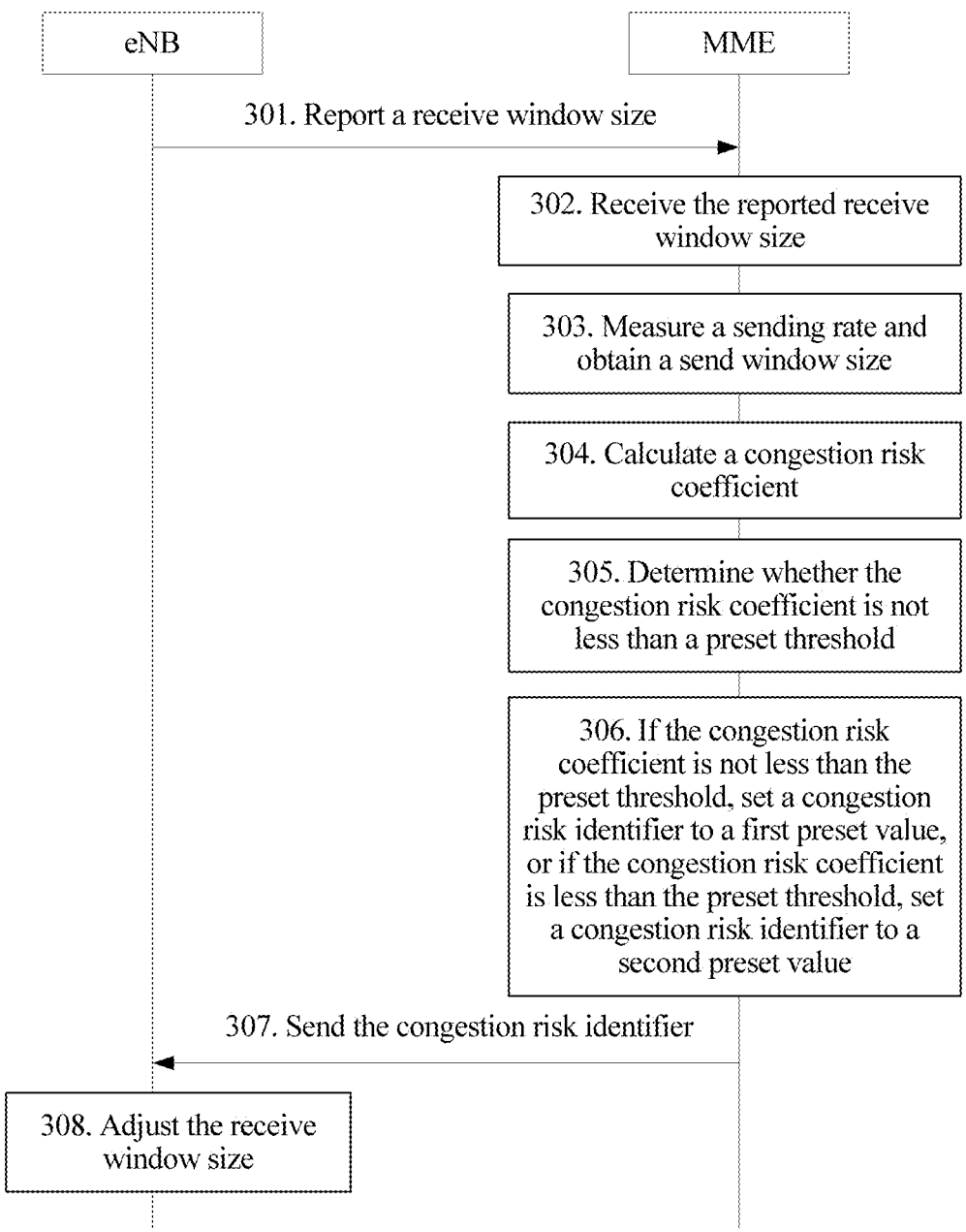
FIG. 3 is a schematic flowchart of a congestion control method according to some other embodiments of the present disclosure.

FIG. 3 is a schematic flowchart of a congestion control method according to some embodiments of the present disclosure. As shown in FIG. 3, the congestion control method may include the following steps.

Steps 301 to 306.

Steps 301 to 306 are respectively the same as the foregoing steps 201 to 206, and details are not described herein again.

307. The MME sends the congestion risk identifier to the eNB.

308. The eNB receives the congestion risk identifier, and adjusts the receive window size based on the congestion risk identifier.

It can be learned that a difference between this embodiment of the present disclosure and the embodiment shown in FIG. 2 is that, in this embodiment of the present disclosure, the MME side does not need to adjust the send window size, and only the eNB completes the adjustment to the receive window size.

Figure 4:
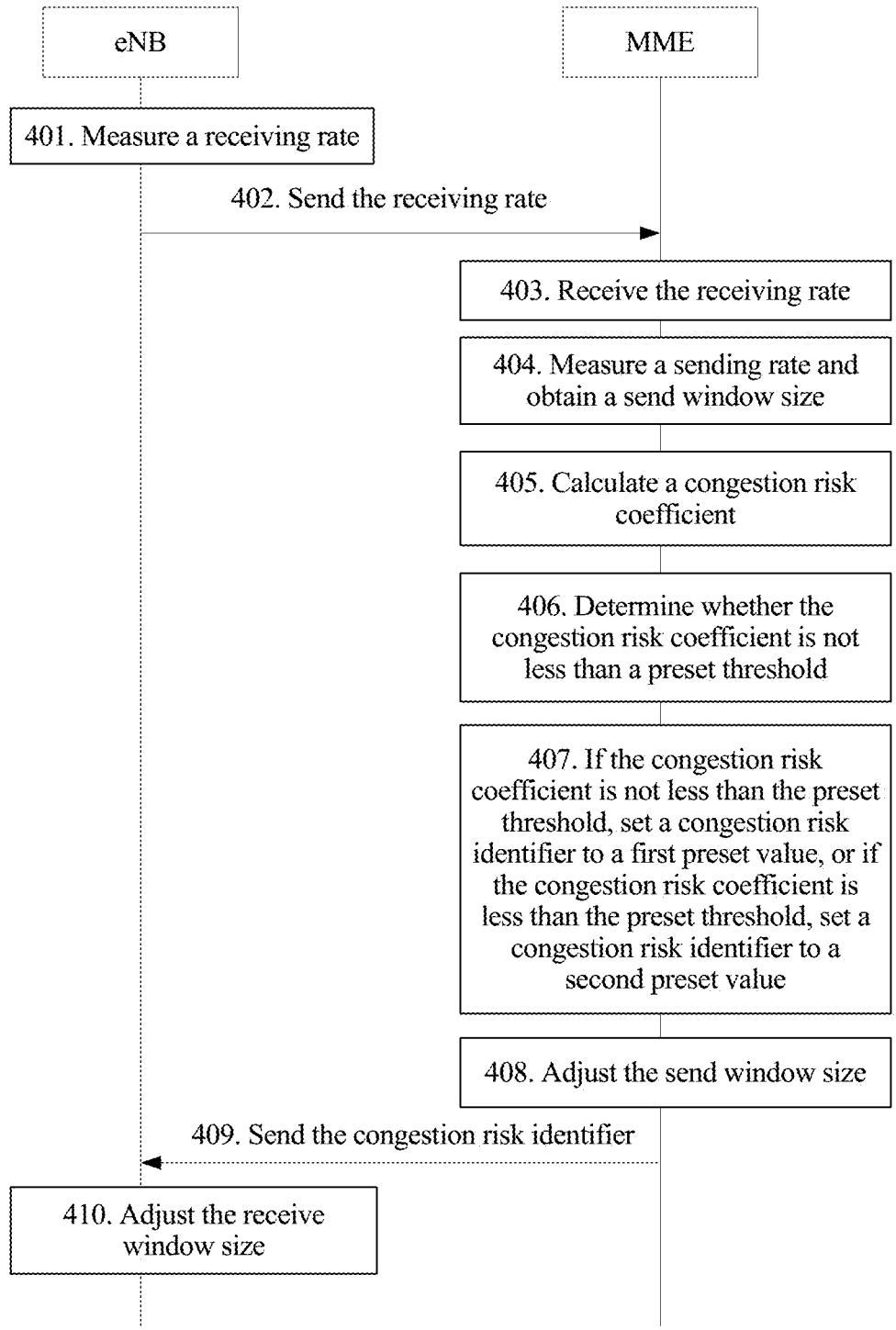
FIG. 4 is a schematic flowchart of a congestion control method according to some other embodiments of the present disclosure.

FIG. 4 is a schematic flowchart of a congestion control method according to some other embodiments of the present disclosure. As shown in FIG. 4, the congestion control method may include the following steps.

401. An eNB measures a receiving rate.

The eNB and an MME start, based on a preset cycle, the congestion control method provided in the present disclosure. For the preset cycle, refer to the descriptions of the preset cycle in the foregoing step 203, and details are not described herein again.

402. The eNB sends the receiving rate to an MME.

403. The MME receives the receiving rate sent by the eNB.

404. The MME measures a sending rate and obtains a send window size.

Based on the foregoing descriptions of the preset cycle, a sequence for performing four steps 401 to 404 is as follows: 401→402→403→404; or 401→402→404→403; or 401→404→402→403; or 404→401→402→403; or (401, 404)→402→403; or 401→(402, 404)→403; or 401→402→(403, 404). (401, 404) indicates that steps 401 and 404 are simultaneously performed, (402, 404) indicates that steps 402 and 404 are simultaneously performed, and (403, 404) indicates that steps 403 and 404 are simultaneously performed.

It is further noted that, the MME may measure the sending rate and obtain the send window size simultaneously, or may measure the sending rate before or after obtaining the send window size. Certainly, step 404 of measuring the sending rate and obtaining the send window size may be split into two steps. In this case, in combination with 401 to 403, five steps may be properly sequenced. Sequences are not listed one by one herein.

405. The MME calculates a congestion risk coefficient of an SCTP link based on the receiving rate, the sending rate, and the send window size.

406 to 410.

Steps 406 to 410 are respectively the same as the foregoing steps 205 to 209, and details are not described herein again.

It can be learned that a difference between this embodiment of the present disclosure and the foregoing two embodiments is that, in this embodiment of the present disclosure, when the MME calculates the congestion risk coefficient, the receiving rate of the eNB, and the sending rate and the send window size that are of the MME are considered. Likewise, in this embodiment of the present disclosure, it is possible that only the MME side completes the adjustment to the send window size, or only the eNB completes the adjustment to the receive window size, or the MME completes the adjustment to the send window size, and the eNB also completes the adjustment to the receive window size, thereby implementing congestion control on the SCTP link in advance.

Figure 5:
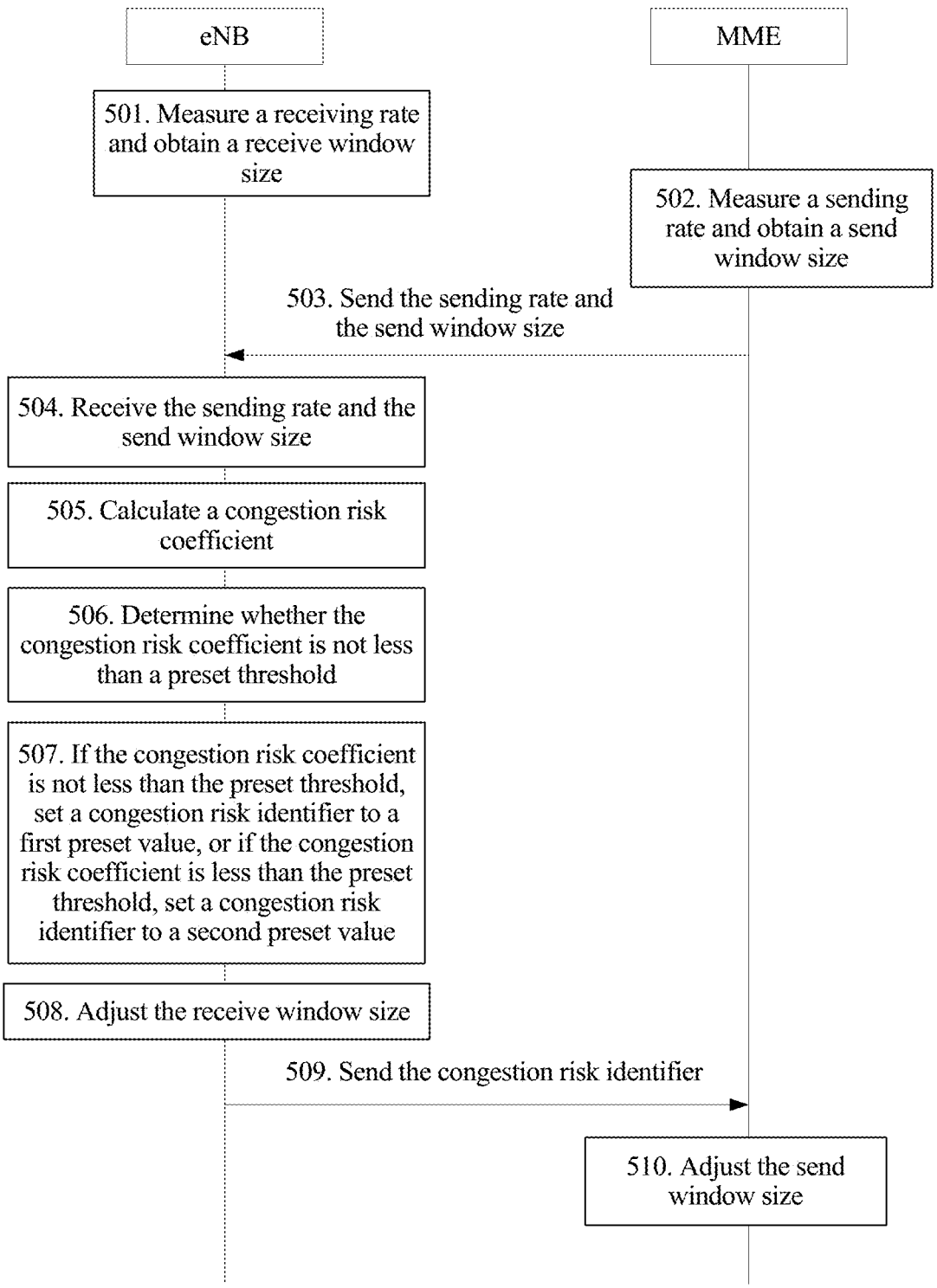
FIG. 5 is a schematic flowchart of a congestion control method according to some other embodiments of the present disclosure.

FIG. 5 is a schematic flowchart of a congestion control method according to some other embodiments of the present disclosure. As shown in FIG. 5, the congestion control method may include the following steps.

501. An eNB measures a receiving rate and obtains a receive window size.

The eNB and an MME start, based on a preset cycle, the congestion control method provided in the present disclosure. For the preset cycle, refer to the descriptions of the preset cycle in the foregoing step 203, and details are not described herein again.

The eNB may measure the receiving rate and obtain the receive window size simultaneously, or may measure the receiving rate before or after obtaining the receive window size.

502. The MME measures a sending rate and obtains a send window size.

The MME may measure the sending rate and obtain the send window size simultaneously, or may measure the sending rate before or after obtaining the send window size.

503. The MME sends the sending rate and the send window size to the eNB.

A sequence for performing steps 501 to 503 may be as follows: 501→502→503; or 502→503→501; or (501, 502) →503; or 502→(501, 503). (501, 502) indicates that steps 501 and 502 are simultaneously performed, and (501, 503) indicates that steps 501 and 503 are simultaneously performed. Certainly, a person of ordinary skill in the art may understand that, in this embodiment of the present disclosure, steps of measuring the receiving rate and obtaining the receive window size, measuring the sending rate, and obtaining the send window size may be obtained through subdivision. These steps together with step 503 are five steps in total, and may be properly sequenced. Sequences are not listed one by one herein.

504. The eNB receives the sending rate and the send window size.

505. The eNB calculates a congestion risk coefficient based on the receiving rate and the receive window size that are of the eNB, and the sending rate and the send window size that are of the MME.

It should be noted that, in this embodiment of the present disclosure, a congestion control apparatus provided in the embodiment of the present disclosure is disposed in the eNB. Certainly, the congestion control apparatus provided in the embodiment of the present disclosure may also be disposed in the MME. However, the congestion control apparatus disposed in the MME is configured only to adjust the send window size, but does not determine a congestion risk coefficient. Specific descriptions are given below.

506. The eNB determines whether the congestion risk coefficient obtained through calculation is not less than a preset threshold.

A preset threshold is preset in the congestion control apparatus or the eNB.

507. If the congestion risk coefficient is not less than the preset threshold, the eNB sets a congestion risk identifier to a first preset value, or if the congestion risk coefficient is less than the preset threshold, the eNB sets a congestion risk identifier to a second preset value.

Step 507 is the same as step 206, and for details, refer to the descriptions in step 206.

508. The eNB adjusts the receive window size based on the congestion risk identifier.

When the congestion risk identifier is set to the first preset value, the receive window size is lowered. To be specific, a current receive window size is reduced, so that a quantity of data streams that can be received by the eNB becomes smaller, to be specific, an upper limit of data streams on a transmission link (an SCTP link) is reduced. However, when the congestion risk identifier is set to the second preset value, a current receive window size of the eNB may be maintained without processing.

509. The eNB sends the congestion risk identifier to the MME.

510. The MME adjusts the send window size based on the congestion risk identifier.

When the congestion risk identifier is set to the first preset value, the send window size is lowered. To be specific, a current send window size is reduced, so that an upper limit of data streams that are allowed to be transmitted by the MME becomes smaller, to be specific, a maximum quantity of data streams that are allowed to be transmitted on the SCTP link during an instantaneous burst is reduced. However, when the congestion risk identifier is set to the second preset value, a current send window size of the MME may be maintained without processing.

It should be noted that there is no sequence of performing step 508 and step 509.

It can be learned that, a difference between this embodiment of the present disclosure and the foregoing embodiment is that, in this embodiment of the present disclosure, the eNB completes calculation of the congestion risk coefficient and setting of the congestion risk identifier. The MME side only needs to complete the adjustment to the send window size. Certainly, in this embodiment of the present disclosure, it is possible that only the MME side completes the adjustment to the send window size, or only the eNB completes the adjustment to the receive window size, or the MME completes the adjustment to the send window size, and the eNB also completes the adjustment to the receive window size, thereby implementing congestion control on the SCTP link in advance.

Figure 6:
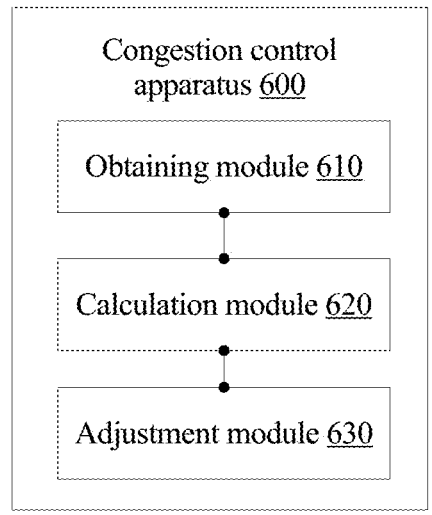
FIG. 6 is a schematic structural diagram of a congestion control apparatus according to an embodiment of the present disclosure.

FIG. 6 is a schematic structural diagram of a congestion control apparatus according to an embodiment of the present disclosure. As shown in FIG. 6, the congestion control apparatus 600 may include: an obtaining module 610, a calculation module 620, and an adjustment module 630. The obtaining module 610 may be configured to: obtain a transmission rate of a transmission link, and obtain a congestion control window size of the transmission link. The calculation module 620 may be configured to calculate a congestion risk coefficient of the transmission link based on the transmission rate and the congestion control window size. The adjustment module 630 may be configured to: determine whether the congestion risk coefficient is not less than a preset threshold, and if the congestion risk coefficient is not less than the preset threshold, trigger an adjustment to the congestion control window size.

It can be learned that, in the present disclosure, a relatively safe preset threshold used to detect a congestion risk is preset, then the obtaining module 610 obtains the transmission rate and the congestion control window size that are of the transmission link in real time, and the calculation module 620 calculates a current congestion risk coefficient based on the transmission rate and the congestion control window size. If the congestion risk coefficient is not less than the preset threshold, it indicates that a congestion may burst on the transmission link, and then the adjustment module 630 triggers an adjustment to the congestion control window size, so as to identify congestion in advance and avoid congestion, thereby reducing impact on the transmission link caused by congestion packet loss, and improving network bandwidth utilization.

Optionally, in some embodiments of the present disclosure, the obtaining module 610 is specifically configured to: obtain a sending rate of a transmit end on the transmission link and/or a receiving rate of a receive end on the transmission link, and obtain a congestion control window size of the transmit end on the transmission link and/or a congestion control window size of the receive end on the transmission link.

Optionally, in some embodiments of the present disclosure, the calculation module 620 is specifically configured to calculate the congestion risk coefficient of the transmission link based on the sending rate of the transmit end and/or the receiving rate of the receive end and the congestion control window size of the transmit end and/or the congestion control window size of the receive end.

Optionally, in some embodiments of the present disclosure, the adjustment module 630 is specifically configured to trigger an adjustment to the congestion control window size of the transmit end and/or the congestion control window size of the receive end.

Optionally, in some embodiments of the present disclosure, the obtaining module 610 is further specifically configured to: based on a preset cycle, measure the transmission rate of the transmission link and obtain the congestion control window size of the transmission link.

Figure 7:
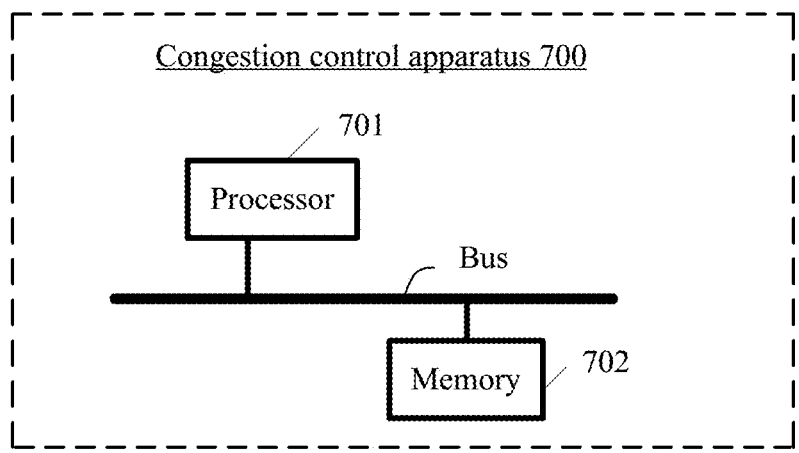
FIG. 7 is another schematic structural diagram of a congestion control apparatus according to an embodiment of the present disclosure.

FIG. 7 is another schematic structural diagram of a congestion control apparatus according to an embodiment of the present disclosure. The congestion control apparatus 700 may include at least one processor 701 (for example, a CPU (Central Processing Unit)), at least one network interface or another communications interface, a memory 702, and at least one communications bus that is configured to implement connection and communication between these apparatuses. The processor 701 is configured to execute an executable module such as a computer program stored in the memory. The memory 702 may include a high-speed random access memory (RAM), and may further include a non-volatile memory, such as at least one magnetic disk storage. The at least one network interface (which may be wired or wireless) is used to implement a communicative connection between a system gateway and at least one another network element using the Internet, a wide area network, a local area network, a metropolitan area network, or the like.

As shown in FIG. 7, in some implementations, the memory 702 stores a program instruction, and the program instruction may be executed by the processor 701. The processor 701 specifically performs the following steps: obtaining a transmission rate of a transmission link, and obtaining a congestion control window size of the transmission link; calculating a congestion risk coefficient of the transmission link based on the transmission rate and the congestion control window size; and determining whether the congestion risk coefficient is not less than a preset threshold, and if the congestion risk coefficient is not less than the preset threshold, triggering an adjustment to the congestion control window size.

In some implementations, the processor 701 further specifically performs the following steps: obtaining a sending rate of a transmit end on the transmission link and/or a receiving rate of a receive end on the transmission link, and obtaining a congestion control window size of the transmit end on the transmission link and/or a congestion control window size of the receive end on the transmission link.

In some implementations, the processor 701 further specifically performs the following step: calculating the congestion risk coefficient of the transmission link based on the sending rate of the transmit end and/or the receiving rate of the receive end and the congestion control window size of the transmit end and/or the congestion control window size of the receive end.

In some implementations, the processor 701 further specifically performs the following step: triggering an adjustment to the congestion control window size of the transmit end and/or the congestion control window size of the receive end.

In some implementations, the processor 701 further specifically performs the following steps: based on a preset cycle, measuring the transmission rate of the transmission link and obtaining the congestion control window size of the transmission link.

Figure 8A:
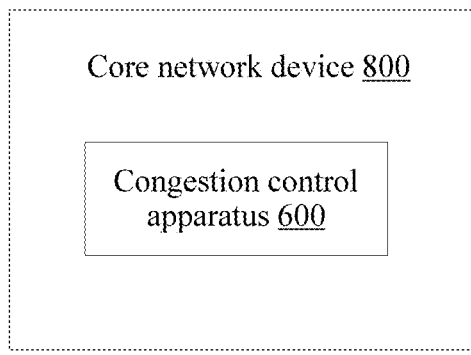
FIG. 8a and FIG. 8b are schematic structural diagrams of a core network device according to some embodiments of the present disclosure.
Figure 8B:
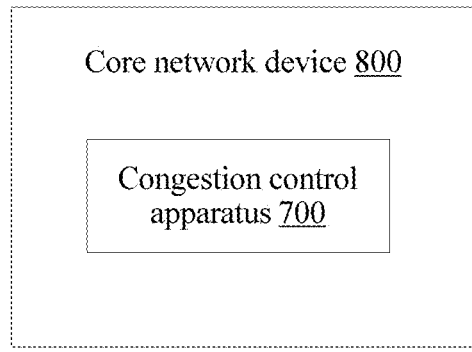

FIG. 8a and FIG. 8b are schematic structural diagrams of a core network device according to some embodiments of the present disclosure. As shown in FIG. 8a, the core network device 800 may include the congestion control apparatus 600 provided in FIG. 6, or as shown in FIG. 8b, the core network device 800 may include the congestion control apparatus 700 provided in FIG. 7. For the congestion control apparatus 600 and the congestion control apparatus 700, refer to the detailed descriptions of the foregoing method embodiments and apparatus embodiments, and details are not described herein again.

Figure 9A:
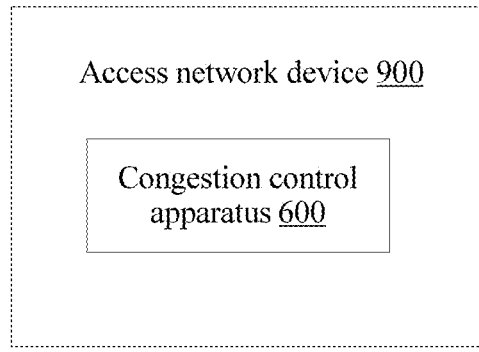
FIG. 9a and FIG. 9b are schematic structural diagrams of an access network device according to some embodiments of the present disclosure.
Figure 9B:
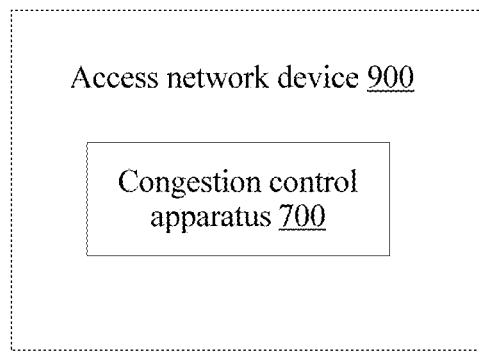

FIG. 9a and FIG. 9b are schematic structural diagrams of an access network device according to some embodiments of the present disclosure. As shown in FIG. 9a, the access network device 900 may include the congestion control apparatus 600 provided in FIG. 6, or as shown in FIG. 9b, the access network device 900 may include the congestion control apparatus 700 provided in FIG. 7. For the congestion control apparatus 600 and the congestion control apparatus 700, refer to the detailed descriptions of the foregoing method embodiments and apparatus embodiments, and details are not described herein again.

Figure 10:
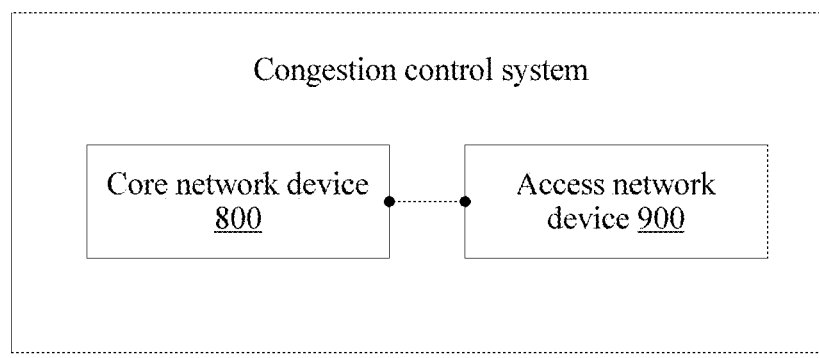
FIG. 10 is a schematic structural diagram of a congestion control system according to some embodiments of the present disclosure.

FIG. 10 is a schematic structural diagram of a congestion control system according to some embodiments of the present disclosure. As shown in FIG. 10, the congestion control system may include the core network device shown in FIG. 8 and the access network device shown in FIG. 9.

In the foregoing embodiments, the description of each embodiment has respective focuses. For a part that is not described in detail in an embodiment, refer to related descriptions in other embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the current systems, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The congestion control method, apparatus, and system, and the related device provided in the present disclosure have been described in detail above, and a person of ordinary skill in the art can make modifications to specific implementations and the application scope based on the ideas of the embodiments of the present disclosure. In conclusion, the content of this specification should not be understood as a limitation on the present disclosure.

What is claimed is:

1. A method, comprising:
    obtaining, by a first network device, a transmission rate of a transmission link and a congestion control window size of the transmission link;
    calculating, by the first network device, a congestion risk coefficient of the transmission link based on the transmission rate and the congestion control window size;
    determining, by the first network device, whether the congestion risk coefficient meets or exceeds a preset threshold; and
    in response to determining that the congestion risk coefficient meets or exceeds the preset threshold, triggering, by the first network device, an adjustment to the congestion control window size.

2. The method according to claim 1, wherein the transmission rate of the transmission link comprises a sending rate of a transmit end on the transmission link.

3. The method according to claim 1, wherein the transmission rate of the transmission link comprises a receiving rate of a receive end on the transmission link.

4. The method according to claim 1, wherein the congestion control window size of the transmission link comprises a congestion control transmit window size of a transmit end on the transmission link.

5. The method according to claim 1, wherein the congestion control window size of the transmission link comprises a congestion control receive window size of a receive end on the transmission link.

6. The method according to claim 1, wherein obtaining the transmission rate of the transmission link and the congestion control window size of the transmission link comprises:
    measuring the transmission rate of the transmission link based on a preset cycle; and
    obtaining the congestion control window size of the transmission link.

7. An apparatus, comprising:
    a processor; and
    a non-transitory computer-readable storage medium storing a program to be executed by the processor, the program including instructions for:
        obtaining a transmission rate of a transmission link and a congestion control window size of the transmission link;
        calculating a congestion risk coefficient of the transmission link based on the transmission rate and the congestion control window size; and
        determine whether the congestion risk coefficient is greater than or equal to a preset threshold, and when the congestion risk coefficient is greater than or equal to the preset threshold, trigger an adjustment to the congestion control window size.

8. The apparatus according to claim 7, wherein the transmission rate of the transmission link comprises a sending rate of a transmit end on the transmission link.

9. The apparatus according to claim 7, wherein the transmission rate of the transmission link comprises a receiving rate of a receive end on the transmission link.

10. The apparatus according to claim 7, wherein the congestion control window size of the transmission link comprises a congestion control transmit window size of a transmit end on the transmission link.

11. The apparatus according to claim 7, wherein the congestion control window size of the transmission link comprises a congestion control receive window size of a receive end on the transmission link.

12. The apparatus according to claim 7, wherein the program further includes instructions for:
    measuring the transmission rate of the transmission link based on a preset cycle; and
    obtaining the congestion control window size of the transmission link.

13. The apparatus according to claim 7, wherein the apparatus is comprised in a core network device.

14. The apparatus according to claim 7, wherein the apparatus is comprised in an access network device.

15. A method, comprising:
    obtaining, by a first network device, transmission rates of a transmission link and window sizes of the transmission link;
    calculating, by the first network device, a congestion risk coefficient of the transmission link according to the transmission rates of the transmission link and the window sizes of the transmission link;
    determining, by the first network device, a congestion risk identifier according to a comparison between the congestion risk coefficient and a preset threshold; and
    adjusting, by the first network device, the window sizes of the transmission link according to the congestion risk identifier.

16. The method according to claim 15, wherein:
    the first network device is at a receiving end of the transmission link; and
    a second network device is at a sending end of the transmission link.

17. The method according to claim 16, wherein:
    the transmission rates of the transmission link comprises a receiving rate of the transmission link and a sending rate of the transmission link;
    the window sizes of the transmission link comprises a receive window size of the transmission link and a send window size of the transmission link; and
    obtaining the transmission rates of the transmission link and the window sizes of the transmission link comprises:
        measuring, by the first network device, the receiving rate of the transmission link and the receive window size of the transmission link; and
        receiving, by the first network device from the second network device, the sending rate of the transmission link and the send window size of the transmission link.

18. The method according to claim 17, wherein adjusting the window sizes of the transmission link comprises:
    in response to determining that the congestion risk identifier is set to a first preset value indicative of a high congestion risk:
        reducing, by the first network device, the receive window size of the transmission link; and sending, by the first network device to the second network device, the congestion risk identifier, causing the second network device to adjust the send window size of the transmission link according to the congestion risk identifier.

19. The method according to claim 15, wherein determining the congestion risk identifier comprises:

comparing, by the first network device, the congestion risk coefficient with the preset threshold;

in response to determining that the congestion risk coefficient exceeds the preset threshold, setting the congestion risk identifier to a first preset value indicative of a high congestion risk; and in response to determining that the congestion risk coefficient does not exceed the preset threshold, setting the congestion risk identifier to a second preset value indicative of a low congestion risk.

\* \* \* \* \*